Dec. 27, 1955   C. J. FRANKLIN   2,728,160
FISH LURES
Filed Nov. 17, 1953   2 Sheets-Sheet 1
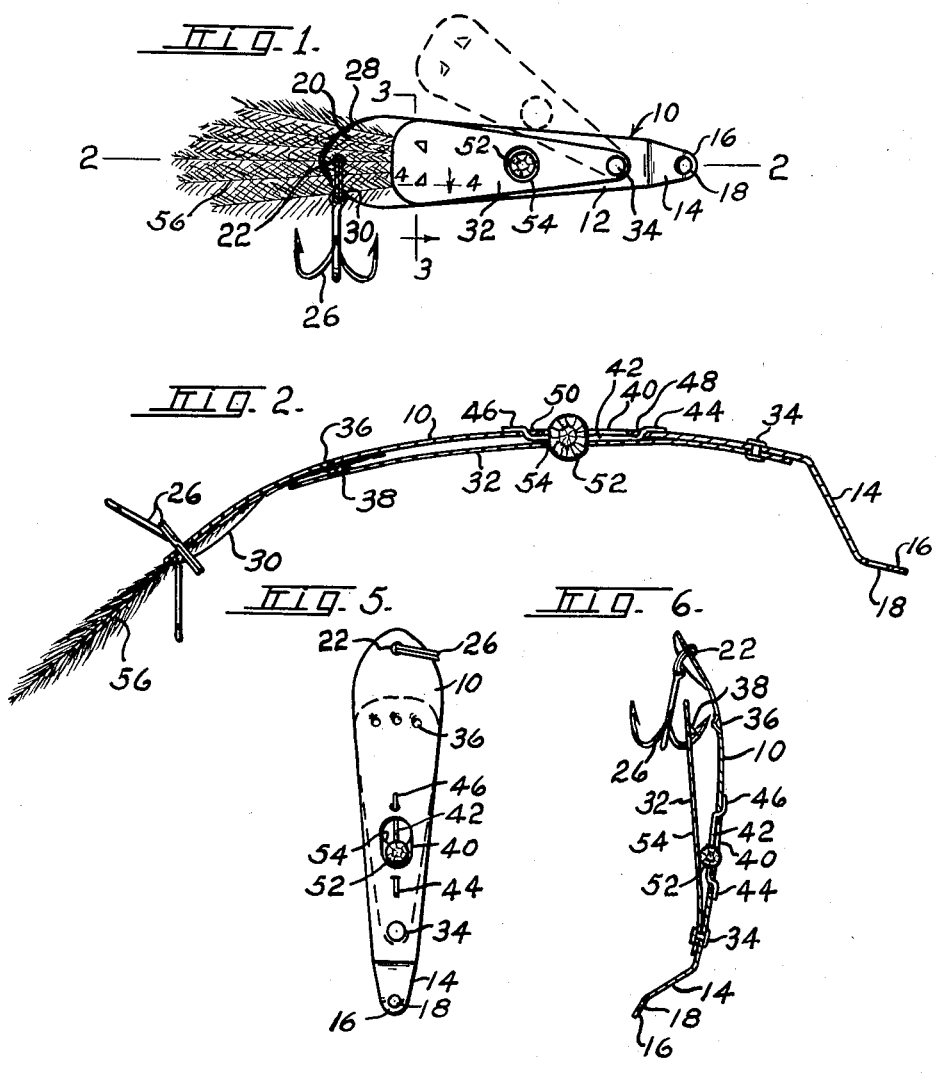
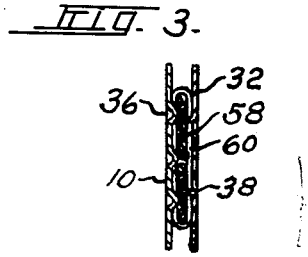
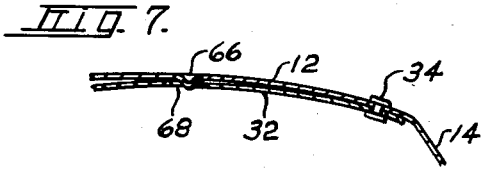
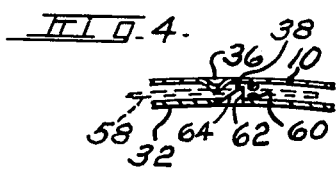
INVENTOR
CHARLES J. FRANKLIN
BY
F. P. Keiper
ATTORNEY Dec. 27, 1955 C. J. FRANKLIN 2,728,160
FISH LURES
Filed Nov. 17, 1953 2 Sheets-Sheet 2
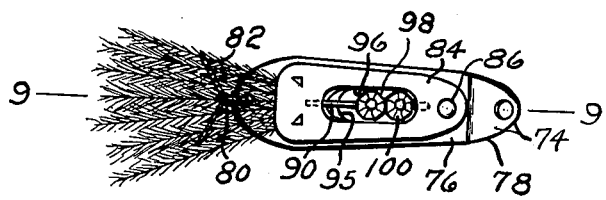
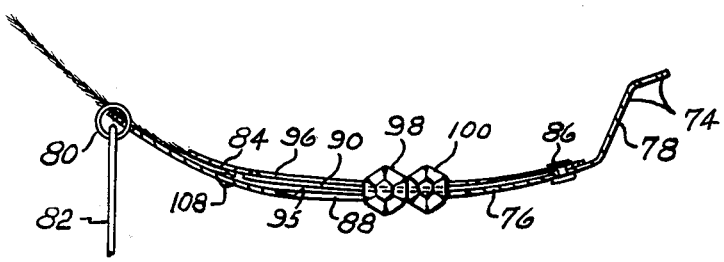
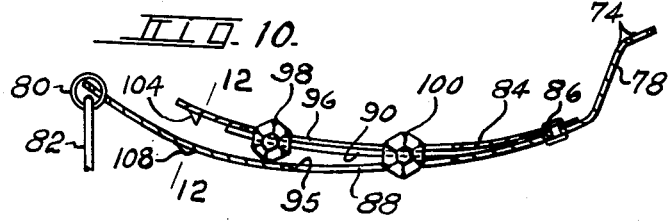
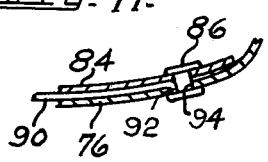
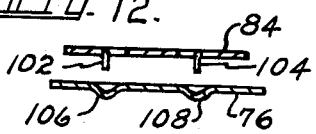
INVENTOR
CHARLES J. FRANKLIN
BY
ATTORNEY United States Patent Office 2,728,160
Patented Dec. 27, 1955

2,728,160
FISH LURES
Charles J. Franklin, Rochester, N. Y.
Application November 17, 1953, Serial No. 392,571
21 Claims. (Cl. 43—42.28)

This invention relates to fish lures, and more particularly to a fish lure having provision for detachably securing a cluster of feathers adapted to trail rearwardly over a hook.

The present invention is a continuation in part of my copending application Serial No. 324,891, filed December 9, 1952, and now abandoned such latter application being an improvement over and copending with application Serial No. 705,191, filed October 23, 1946, now Patent No. 2,627,135, issued February 3, 1953, said applications disclosing a pair of plates adapted to be held in tight engagement over one another, at least one, or both of the plates having an inclined forward leading end portion, and such plates being adapted to releasably clamp a cluster of feathers in trailing relation over a trailing hook.

It is an object of the present invention to provide a feather cluster holding structure employing two clamp plates, wherein the plates are attached to one another at one end, and in which the plates may be spread apart for easy insertion or removal of a feather cluster. A further object of the invention is to provide a camming means for spreading the plates for removal of insertion of feather clusters, such camming means employing one or more attractive beads mounted on one of the plates and cooperating with the other. In one form of the invention, the plates are merely spread apart, while in another form, the plates are spread, and thereafter may be swung apart to further separate the plates. A further object of the invention, in connection with the one form, is to provide roller means in the form of an attractive bead adapted to function as a locking means as well as facilitate the swinging movement and further spreading of the plates when unlocked. The invention further has to do with improved gripping structure, including saw teeth, for effectively securing the cluster of feathers in trailing position with respect to the plates.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view of one form of the fish lure;

Figure 2 is an enlarged longitudinal section, shown inverted, taken susbtantially on the line 2—2 of Figure 1;

Figure 3 is a transverse section taken substantially on the line 3—3 of Figure 1, the portions in rear of the section being omitted;

Figure 4 is a fragmentary enlarged longitudinal sectional view taken on the line 4—4 of Figure 1, showing the tooth configuration;

Figure 5 is a bottom plan view;

Figure 6 is a longitudinal sectional view showing the plates spread by bead action;

Figure 7 is a fragmentary sectional view similar to Figure 2, illustrating a modified form of the invention;

Figure 8 is a top plan view of a modified form of the invention;

Figure 9 is a slightly enlarged longitudinal sectional view taken substantially on the line 9—9 of Figure 8;

Figure 10 is an enlarged longitudinal sectional view similar to Figure 9, showing the plates spread apart;

Figure 11 is an enlarged fragmentary sectional view similar to Figure 9 through the plate juncture; and Figure 12 is an enlarged transverse sectional view taken substantially on the line 12—12 of Figure 10.

Referring to Figure 1, there is shown an elongated plate 10 having a body portion 12 and a forward end portion 14 integral with but extending obliquely from the plane of the body portion 12. The forward end portion is provided with a tip 16 having an aperture 18 therein, to which a leader may be attached. The body portion tapers rearwardly to a slightly enlarged width and is rounded at the rear end as at 20, the rear end being provided with an aperture 22 to which is secured a split ring and a suitable cluster hook 26. The curved side edges of the end 20 may be curved as indicated at 28 and 30.

Pivoted upon the body portion 12 at the forward end is a second plate 32 adapted to overlie the body portion 12. Such plate is pivotally connected to the body portion by a rivet or other fastening device as at 34, and is adapted to swing from the overlying position shown in Figure 1 to that shown in dotted lines in Figure 1. The body portion is provided with a series of projections 36 arranged on a line extending transverse of the body portion, the projections extending toward the plate 32. Likewise, the plate 32 is provided with projections 38 extending on a line crosswise thereof, such projections extending toward the body portion 12, and in adjacent relative position to the projections 36. The projections may be of saw tooth shape and struck from the plate 32.

The body portion has provided centrally thereof an elongated slot 40, the slot being bridged longitudinally thereof by a stiff wire 42, the ends of which are offset as at 44 and 46 and projected through apertures 48 and 50 in the body portion, the offsets 44 and 46 serving to secure the wire in position. Loosely threaded upon the wire is a bead 52, which may be colored and provided with a plurality of facets whereby such bead may reflect or refract light and attract fish.

The plate 32 is provided with an aperture 54 of a diameter slightly larger than the bead 52, such aperture being in alignment with the rear portion of the slot 40. The bead is of such diameter as to project through the aperture 54, and thereby be exposed to observation from either side of the lure when moved to a rearward position in the slot.

The projections 36 and 38 are adapted to grip a cluster of feathers 56 by the stems 58 thereof, and in order to facilitate insertion of such feathers between the plates or the removal thereof, the plate 32 may be sprung away from the body portion 12 of the plate 10 by sliding the bead forwardly on the wire 42, forward of the aperture 54, as indicated in Figure 5. If it be further desired to swing the plate 32 out of overlying position with respect to the body portion 12, the same may be rolled upon the bead to the position shown in dotted lines in Figure 1. While sliding the bead to the forward position is preferable prior to swinging the plate 32 on the pivot 34, the plate may be swung on the pivot 34 with the bead in rearward position by merely spreading the plates sufficiently and rolling the lateral edge of the aperture 54 over the bead. It will be appreciated that the plates 10 and 32 will be made of resilient material adapted to hold their shape and yet be resiliently sprung apart in the manner described.

The cluster of feathers may be secured together by a transverse wire binder 60, holding the stems in closely parallel relation in a single plane, such binder being applied in a manner as disclosed in Patent No. 2,686,307 issued August 17, 1954.

In order to securely hold the cluster of feathers between the plate in trailing relation to hide the hook, the projections 36 may be as shown in Figure 3, three in number, such projections being in the form of abrupt pointed dimples drawn from the material of the body portion 12. The projections on the second plate 32 are preferably struck from such plate and take the form of saw teeth lying in fore and aft plates, the forward edge 62 of which teeth will be substantially perpendicular to the plane of plate 32, and the rearward edge of which will be inclined as at 64 to facilitate assembly of a feather cluster, and to form a positive grip against any tendency to dislodge the cluster as by the tug of a fish. In practice, the teeth 38 will be located on a transverse line just forward of the dimples 36, and when the cluster of feathers is in position, the wire binder will be located just forward of the teeth.

In practice, it may be desirable to eliminate the bead, and as shown in Figure 6, the body portion 12 in such event may be modified to include a projection 66 adapted to engage in an aperture 68 in plate 32 similar to, but smaller than aperture 54, to form a lock to hold the plates superimposed upon each other. In such an arrangement, the plates may be slightly sprung apart and angularly disposed with respect to one another by reason of the pivot 34 for the purpose of inserting or removing a feather cluster, the action being sliding rather than rolling as in the case of the bead and the projection coacting with the other plate for spreading the rearward ends of the plates apart.

The plates preferably will have a slight curvature from front to rear, as indicated in Figures 2 and 5, and as set forth in my copending application above referred to, the lure, when drawn through the water, will have the effect of zig-zagging to provide a movement simulating a live minnow.

In the modification of Figures 8–12, inclusive, there is shown a main plate 74 having a concave curved body portion 76, and an inclined leading end portion 78. At the trailing end, there is provided a ring 80 and hook cluster indicated at 82. Overlying the major portion of the body portion is a plate 84 having an outline generally of, but lying within, the shape of the body portion 76, such plate being secured to the forward end of the body portion as by a rivet 86. The body portion is provided with an elongated slot 88 located centrally thereof, over which extends a resilient wire 90, such wire having a bent end 92 in the forward end, the end being forced in the aperture 94 in the body portion through which the rivet 84 extends, such bent end and the adjacent porportion of the wire being securely held in place between the plates.

The rearward end of the slot terminates in an inclined camming edge 95. The plate 84 is provided with a slot 96 coextensive with the slot 88 in the body portion, but extending rearwardly beyond the camming edge 95 of the slot 88. As more clearly shown in Figure 10, the wire extends rearwardly beyond the rear end of the slot 96. Threaded on the wire 90 are one or more colored beads, such as 98 and 100, such beads being freely slidable thereon. By sliding the bead 98 rearwardly to the position shown in Figure 10, it will be seen that the plate 84 is cammed apart from the body portion 76 of the plate 74. In practice, both beads 98 and 100 are thrust rearwardly by thumb pressure from beneath to produce the spreading action indicated, the bead 98 serving to temporarily hold the plates spread apart, while the bead 100 remains loosely positioned on the wire.

As in the form of the invention shown in Figures 1–6, inclusive, the plate 84 is provided with struck out teeth 102 and 104, projecting toward the plate 76. As shown in Figure 12, such teeth are aligned with depressions 106 and 108 in the plate 76, so that when a feather cluster is positioned between the plates, and the plates returned to the position shown in Figure 9, such cluster is securely locked in place. In practice, such clusters may have a binding wire 38 as shown in Figure 3, and in my Patent No. 2,686,307, which binding wire may be positioned ahead of the teeth when clamped in place, to thereby further secure the cluster.

The plates and wire are preferably of resilient material, so that when not spread apart, the parts spring together under tension. It will be seen that in the modification, it is possible to spring the plates apart, and additionally spring the wire away from the plate 84, for the replacement or substitution of different colored or combinations of colored beads, so that the attractive appearance of the lure may be altered, and thereby vary the effectiveness of the lure.

While the invention has been illustrated and described with reference to three forms thereof, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A fish lure comprising an elongated plate having a body portion and an end portion at the forward end of the body portion bent obliquely from the plane of the body portion of the plate, said end portion in the tip thereof having means for securing a leader, and said body portion at the rearward end thereof having means for attaching a hook, a second plate mounted on the body portion, said second plate having a pivotal attachment to the body portion located toward the forward end of the body portion, and said second plate being adapted to extend rearwardly and overlie a substantial part of the body portion, said body portion and said second plate having facing projections and being adapted to grip therebetween a cluster of feathers and means mounted on one of the plates and adapted to coact with the other for spreading the rearward ends of said plates apart.

2. A fish lure comprising an elongated plate having a body portion, a second plate pivotally mounted on the body portion having a configuration lying over a substantial part of the body portion, said second plate having a pivotal attachment to the body portion located toward the forward end of the body portion, and said second plate being adapted to extend rearwardly and overlie the body portion, said body portion and said second plate having facing projections and being adapted to grip therebetween a cluster of feathers and means mounted on one of the plates and adapted to coact with the other for spreading the rearward ends of said plates apart.

3. A fish lure comprising an elongated plate having a body portion, a second plate pivotally mounted on the body portion having a configuration lying over a substantial part of the body portion, said second plate having a pivotal attachment to the body portion located toward the forward end of the body portion, and said second plate being adapted to extend rearwardly and overlie the body portion, said body portion and said second plate having facing projections and being adapted to grip therebetween a cluster of feathers, certain of said projections being saw tooth in form and being struck from one of said plates and means mounted on one of the plates and adapted to coact with the other for spreading the rearward ends of said plates apart.

4. A fish lure comprising an elongated plate having a body portion and an end portion at the forward end of the body portion bent obliquely from the plane of the body portion of the plate, said end portion in the tip thereof having means for securing a leader, and said body portion at the rearward end thereof having means for attaching a hook, a second plate mounted on the body portion, said second plate having a pivotal attachment to the body portion located toward the forward end of the body portion, and said second plate being adapted to extend rearwardly and overlie a substantial part of the body portion, said body portion and said second plate having facing projections, a cluster of feathers having stem portions gripped between said facing projections and extending rearwardly beyond the body portion, said second plate being adapted to be swung out of overlying position with respect to the body portion to facilitate the insertion of and removal of the stems of said cluster of feathers and means mounted on one of the plates and adapted to coact with the other for spreading the rearward ends of said plates apart.

5. A fish lure comprising an elongated resilient plate having a body portion and an end portion at the forward end of the body portion bent obliquely from the plane of the body portion of the plate, said end portion in the tip thereof having means for securing a leader, and said body portion at the rearward end thereof having means for attaching a hook, a second resilient plate mounted on the body portion, said second plate having a pivotal attachment to the body portion located toward the forward end of the body portion, and said second plate being adapted to extend rearwardly and overlie a substantial part of the body portion, said body portion and said second plate having facing projections and being adapted to grip therebetween a cluster of feathers, a cluster of feathers having stem portions gripped between said facing projections and extending rearwardly beyond the body portion, said second plate being adapted to be swung out of overlying position with respect to the body portion to facilitate the insertion and removal of the stems of said cluster of feathers, said body portion having a longitudinally extending slot located between the pivotal attachment and projections, a longitudinally extending wire extending lengthwise across said slot and attached to the body portion, a bead threaded on said wire of a diameter less than the length of said slot, and an aperture in said second plate adapted to freely receive said bead, and located to overlie a portion of said slot, whereby said bead may be moved to a position in registry with said aperture and project partially therethrough and to a position out of registry with said aperture to spread said plates and provide a roller in engagement with the second plate to facilitate pivotal movement thereof out of overlying relation to said body portion.

6. A fish lure comprising an elongated resilient plate having a body portion, a second resilient plate mounted on the body portion, said second plate having a pivotal attachment to the body portion located toward the forward end of the body portion, and said second plate being adapted to extend rearwardly and overlie a substantial part of the body portion, said body portion and said second plate having facing projections and being adapted to grip therebetween a cluster of feathers, a cluster of feathers having stem portions gripped between said facing projections and extending rearwardly beyond the body portion, said second plate being adapted to be swung out of overlying position with respect to the body portion to facilitate the insertion of and removal of the stems of said cluster of feathers, said body portion having a longitudinally extending slot located between the pivotal attachment and projections, a longitudinally extending wire extending lengthwise across said slot and attached to the body portion, a bead threaded on said wire of a diameter less than the length of said slot, and an aperture in said second plate adapted to freely receive said bead, and located to overlie a portion of said slot, whereby said bead may be moved to a position in registry with said aperture and project partially therethrough, and to a position out of registry with said aperture to spread said plates and provide a roller in engagement with the second plate to facilitate pivotal movement thereof out of overlying relation to said body portion.

7. A fish lure comprising an elongated resilient plate having a body portion and an end portion at the forward end of the body portion bent obliquently from the plane of the body portion of the plate, said end portion in the tip thereof having means for securing a leader, and said body portion at the rearward end thereof having means for attaching a hook, a second resilient plate mounted on the body portion, said second plate having a pivotal attachment to the body portion located toward the forward end of the body portion, and said second plate being adapted to extend rearwardly and overlie a substantial part of the body portion, said body portion and said second plate having facing projections and being adapted to grip therebetween the stems of a cluster of feathers, said second plate being adapted to be swung out of overlying position with respect to the body portion to facilitate the insertion of and removal of the stems of a cluster of feathers, said body portion having a longitudinally extending slot located between the pivotal attachment and projections, a longitudinally extending wire extending lengthwise across said slot and attached to the body portion, a bead threaded on said wire of a diameter less than the length of said slot, and an aperture in said second plate adapted to freely receive said bead, and located to overlie a portion of said slot, whereby said bead may be moved to a position in registry with said aperture and project partially therethrough, and to a position out of registry with said aperture to spread said plates and provide a roller in engagement with the second plate to facilitate pivotal movement thereof out of overlying relation to said body portion.

8. A fish lure comprising an elongated resilient plate having a body portion, a second resilient plate mounted on the body portion, said second plate having a pivotal attachment to the body portion located toward the forward end of the body portion, and said second plate being adapted to extend rearwardly and overlie a substantial part of the body portion, said body portion and said second plate having facing projections and being adapted to grip therebetween the stems of a cluster of feathers, said second plate being adapted to be swung out of overlying position with respect to the body portion to facilitate the insertion of and removal of the stems of a cluster of feathers, said body portion having a longitudinally extending slot located between the pivotal attachment and projections, a longitudinally extending wire extending lengthwise across said slot and attached to the body portion, a bead threaded on said wire of a diameter less than the length of said slot, and an aperture in said second plate adapted to freely receive said bead, and located to overlie a portion of said slot, whereby said bead may be moved to a position in registry with said aperture and project partially therethrough, and to a position out of registry with said aperture to spread said plates and provide a roller in engagement with the second plate to facilitate pivotal movement thereof out of overlying relation to said body portion.

9. A fish lure comprising an elongated plate having a body portion and an end portion at the forward end of the body portion bent obliquely from the plane of the body portion of the plate, said end portion in the tip thereof having means for securing a leader, and said body portion at the rearward end thereof having means for attaching a hook, a second plate mounted on the body portion, said plate being attached to the body portion at a point located toward the forward end of the body portion, and said second plate being adapted to extend rearwardly and overlie a substantial part of the body portion, said body portion and said second plate having coacting gripping means and being adapted to grip therebetween a cluster of feathers, and means mounted on one of the plates and adapted to coact with the other for spreading the rearward ends of said plates apart.

10. A fish lure comprising an elongated resilient plate having a body portion and an end portion at the forward end of the body portion bent obliquely from the plane of the body portion of the plate, said end portion in the tip thereof having means for securing a leader, and said body portion at the rearward end thereof having means for attaching a hook, a second resilient plate mounted on the body portion, said second plate being attached to the body portion at a point located toward the forward end of the body portion, and said second plate being adapted to extend rearwardly and overlie a substantial part of the body portion, said body portion and said second plate having coacting gripping means and being adapted to grip therebetween a cluster of feathers, a cluster of feathers having stem portions gripped between said facing projections and extending rearwardly beyond the body portion, said second plate being adapted to be spread apart from the body portion to the rear thereof to facilitate the insertion of and removal of the stems of said cluster of feathers, one of said body portion and said second plate having a longitudinally extending slot located between the point of attachment and gripping means, a longitudinally extending wire extending lengthwise across said slot and attached to the body portion, a bead threaded on said wire of a diameter less than the length of said slot, and an aperture in the other of said body portion and second plate adapted to freely receive said bead, and located to overlie a portion of said slot, whereby said bead may be moved to a position in registry with said aperture and slot and project partially therethrough and to a position in said slot out of registry with said aperture to spread said plates.

11. A fish lure comprising an elongated resilient plate having a body portion, a second resilient plate mounted on the body portion, said plate being attached to the body portion at a point located toward the forward end of the body portion, and said second plate being adapted to extend rearwardly and overlie a substantial part of the body portion, said body portion and said second plate having coacting gripping means and being adapted to grip therebetween a cluster of feathers, a cluster of feathers having stem portions gripped between said facing projections and extending rearwardly beyond the body portion, said second plate being adapted to be spread apart from the body portion to the rear thereof to facilitate the insertion of and removal of the stems of said cluster of feathers, one of said body portion and said second plate having a longitudinally extending slot located between the point of attachment and gripping means, a longitudinally extending wire extending lengthwise across said slot and attached to the body portion, a bead threaded on said wire of a diameter less than the length of said slot, and an aperture in the other of said body portion and second plate adapted to freely receive said bead, and located to overlie a portion of said slot, whereby said bead may be moved to a position in registry with said aperture and slot and project partially therethrough and to a position in said slot out of registry with said aperture to spread said plates.

12. A fish lure comprising an elongated resilient plate having a body portion and an end portion at the forward end of the body portion bent obliquely from the plane of the plate, said end portion in the tip thereof having means for securing a leader, and said body portion at the rearward end thereof having means for attaching a hook, a second resilient plate mounted on the body portion, said second plate being attached to the body portion at a point located toward the forward end of the body portion, and said second plate being adapted to extend rearwardly and overlie a substantial part of the body portion, said body portion and said second plate having coacting gripping means and being adapted to grip therebetween the stems of a cluster of feathers, said second plate being adapted to be spread apart from the body portion to the rear thereof to facilitate the insertion of and removal of the stems of a cluster of feathers, one of said body portion and said second plate having a longitudinally extending slot located between the point of attachment and gripping means, a longitudinally extending wire extending lengthwise across said slot and attached to the body portion, a bead threaded on said wire of a diameter less than the length of said slot, and an aperture in the other of said body portion and second plate adapted to freely receive said bead, and located to overlie a portion of said slot, whereby said bead may be moved to a position in registry with said aperture and slot and project partially therethrough and to a position in said slot out of registry with said aperture to spread said plates.

13. A fish lure comprising an elongated resilient plate having a body portion, a second resilient plate mounted on the body portion, said plate being attached to the body portion at a point located toward the forward end of the body portion, and said second plate being adapted to extend rearwardly and overlie a substantial part of the body portion, said body portion and said second plate having coacting gripping means and being adapted to grip therebetween the stems of a cluster of feathers, said second plate being adapted to be spread apart from the body portion to the rear thereof to facilitate the insertion of and removal of the stems of a cluster of feathers, one of said body portion and said second plate having a longitudinally extending slot located between the point of attachment and gripping means, a longitudinally extending wire extending lengthwise across said slot and attached to the body portion, a bead threaded on said wire of a diameter less than the length of said slot, and an aperture in the other of said body portion and second plate adapted to freely receive said bead, and located to overlie a portion of said slot, whereby said bead may be moved to a position in registry with said aperture and slot and project partially therethrough and to a position in said slot out of registry with said aperture to spread said plates.

14. A fish lure comprising an elongated resilient plate having a body portion and an end portion at the forward end of the body portion bent obliquely from the plane of the body portion of the plate, said end portion in the tip thereof having means for securing a leader, and said body portion at the rearward end thereof having means for attaching a hook, a second resilient plate mounted on the body portion, said second plate being attached to the body portion at a point located toward the forward end of the body portion, and said second plate being adapted to extend rearwardly and overlie a substantial part of the body portion, said body portion and said second plate having cooperating facing projections and aligned recesses and being adapted to grip therebetween a cluster of feathers and means mounted on one of the plates and adapted to coact with the other for spreading the rearward ends of said plates apart.

15. A fish lure comprising an elongated resilient plate having a body portion and an end portion at the forward end of the body portion bent obliquely from the plane of the body portion of the plate, said end portion in the tip thereof having means for securing a leader, and said body portion at the rearward end thereof having means for attaching a hook, a second resilient plate mounted on the body portion, said second plate being attached to the body portion at a point located toward the forward end of the body portion, and said second plate being adapted to extend rearwardly and overlie a substantial part of the body portion, said body portion and said second plate having cooperating facing projections and aligned recesses and being adapted to grip therebetween a cluster of feathers, said projections being saw tooth in form and being struck from one of said plates and means mounted on one of the plates and adapted to coact with the other for spreading the rearward ends of said plates apart.

16. A fish lure comprising an elongated resilient plate having a body portion, a second resilient plate mounted on the body portion, said second plate being attached to the body portion at a point located toward the forward end of the body portion, and said second plate being adapted to extend rearwardly and overlie a substantial part of the body portion, said body portion and said second plate having cooperating facing projections and aligned recesses and being adapted to grip therebetween a cluster of feathers, said projections being saw tooth in form and being struck from one of said plates and means mounted on one of the plates and adapted to coact with the other for spreading the rearward ends of said plates apart.

17. A fish lure comprising an elongated resilient plate having a body portion and an end portion at the forward end of the body portion bent obliquely from the plane of the body portion of the plate, said end portion in the tip thereof having means for securing a leader, and said body portion at the rearward end thereof having means for attaching a hook, a second resilient plate mounted on the body portion, said second plate being attached to the body portion at a point located toward the forward end of the body portion, and said second plate being adapted to extend rearwardly and overlie a substantial part of the body portion, said body portion and said second plate having cooperating facing projections and aligned recesses and being adapted to grip therebetween a cluster of feathers, a guide wire bearing on one of said plates having a sliding bead thereon, and a camming edge on the other plate adapted to be engaged by said bead when slid to one position on said wire whereby to spread apart the rearward ends of said plates.

18. A fish lure comprising an elongated resilient plate having a body portion and an end portion at the forward end of the body portion bent obliquely from the plane of the body portion of the plate, said end portion in the tip thereof having means for securing a leader, and said body portion at the rearward end thereof having means for attaching a hook, a second resilient plate mounted on the body portion, said second plate being attached to the body portion at a point located toward the forward end of the body portion, and said second plate being adapted to extend rearwardly and overlie a substantial part of the body portion, said body portion and said second plate having cooperating facing projections and aligned recesses and being adapted to grip therebetween a cluster of feathers, said projections being saw tooth in form and being struck from one of said plates, a guide wire bearing on one of said plates having a sliding bead thereon, and a camming edge on the other plate adapted to be engaged by said bead when slid to one position on said wire whereby to spread apart the rearward ends of said plates.

19. A fish lure comprising an elongated resilient plate having a body portion, a second resilient plate mounted on the body portion, said second plate being attached to the body portion at a point located toward the forward end of the body portion, and said second plate being adapted to extend rearwardly and overlie a substantial part of the body portion, said body portion and said second plate having cooperating facing projections and aligned recesses and being adapted to grip therebetween a cluster of feathers, said projections being saw tooth in form and being struck from one of said plates, a guide wire bearing on one of said plates having a sliding bead thereon, and a camming edge on the other plate adapted to be engaged by said bead when slid to one position on said wire whereby to spread apart the rearward ends of said plates.

20. A fish lure comprising an elongated resilient plate having a body portion, a second resilient plate mounted on the body portion, said second plate being attached to the body portion at a point located toward the forward end of the body portion and said second plate being adapted to extend rearwardly and overlie a substantial part of the body portion, said body portion and said second plate having means to grip therebetween a cluster of feathers, a bead secured to one of said plates and projecting through an aperture in the other, and means for moving the bead relative to the apertured plate, to displace said bead from the aperture whereby to spread said plates.

21. A fish lure comprising an elongated plate having a body portion and an end portion at the forward end of the body portion bent obliquely from the plane of the body portion of the plate, said end portion in the tip thereof having means for securing a leader, and said body portion at the rearward end thereof having means for attaching a hook, a second plate mounted on the body portion, said second plate having a pivotal attachment to the body portion located toward the forward end of the body portion, and said second plate being adapted to extend rearwardly and overlie a substantial part of the body portion, said body portion and said second plate having facing projections and being adapted to grip therebetween a cluster of feathers and one of said plates having means adapted to coact with the other for spreading the rearward ends of said plates apart.

References Cited in the file of this patent

UNITED STATES PATENTS

| | | |
|---|---|---|
| 341,261 | McHarg | May 4, 1886 |
| 717,722 | Strickland | Jan. 6, 1903 |
| 1,495,832 | Aiken | May 27, 1924 |
| 1,568,325 | Dewey | Jan. 5, 1926 |
| 2,021,796 | Liotta | Nov. 19, 1935 |
| 2,034,236 | Jenckes | Mar. 17, 1936 |
| 2,119,805 | Davenport | June 17, 1938 |
| 2,595,436 | Abdallah et al. | May 6, 1952 |
| 2,659,996 | Hegler | Nov. 24, 1953 |

FOREIGN PATENTS

| | | |
|---|---|---|
| 8,409 | Great Britain | 1908 |